US011820290B2

(12) United States Patent
Penaloza et al.

(10) Patent No.: US 11,820,290 B2
(45) Date of Patent: Nov. 21, 2023

(54) TRAILER ALIGNMENT DETECTION FOR DOCK AUTOMATION USING VISION SYSTEM AND DYNAMIC DEPTH FILTERING

(71) Applicant: NIAGARA BOTTLING, LLC, Diamond Bar, CA (US)

(72) Inventors: Jimmy Erik Penaloza, Riverside, CA (US); Parth Naresh Patel, Pasadena, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 281 days.

(21) Appl. No.: 17/230,444

(22) Filed: Apr. 14, 2021

(65) Prior Publication Data
US 2022/0332250 A1 Oct. 20, 2022

(51) Int. Cl.
G05D 1/02 (2020.01)
G06T 7/44 (2017.01)
(Continued)

(52) U.S. Cl.
CPC .......... B60R 1/003 (2013.01); G05D 1/0088 (2013.01); G05D 1/0225 (2013.01); G06T 7/13 (2017.01);
(Continued)

(58) Field of Classification Search
None
See application file for complete search history.

(56) References Cited

U.S. PATENT DOCUMENTS 3,138,812 A 6/1964 Prosser
3,290,709 A 2/1966 Whitenack, Jr. et al.
(Continued)

FOREIGN PATENT DOCUMENTS

CA 1146309 A 5/1983
DE 3049611 A1 7/1982
(Continued)

OTHER PUBLICATIONS

Carlo et al., "II., Real-Time Dock Door Monitoring System Using a Kinect Sensor", dated Jan. 1, 2014, URL: https://www.mhi.org/downloads/learning /cicmhe/colloquium/2014/02-Carlo-%20paper.pdf, (10 Pages).
(Continued)

Primary Examiner — Tyler W. Sullivan
(74) Attorney, Agent, or Firm — Michael Best & Freidrich LLP

(57) ABSTRACT

Systems and methods for determining an alignment of a trailer relative to a docking bay or a vehicle bay door using dynamic depth filtering. Image data and position data is captured by a 3D camera system with an at least partially downward-facing field of view. When a trailer is approaching the docking bay or door, the captured image data includes a top surface of the trailer. A dynamic height range is determined based on an estimated height of the top surface of the trailer in the image data and a dynamic depth filter is applied to filter out image data corresponding to heights outside of the dynamic height range. An angular position and/or lateral offset of the trailer is determined based on the depth-filtered image data.

20 Claims, 6 Drawing Sheets

(51) Int. Cl.

| | | |
|---|---|---|
| *G06T 7/50* | (2017.01) | |
| *B60R 1/00* | (2022.01) | |
| *G06T 7/80* | (2017.01) | |
| *G06T 7/55* | (2017.01) | |
| *G06T 7/73* | (2017.01) | |
| *G06T 7/13* | (2017.01) | |
| *G05D 1/00* | (2006.01) | |
| *G06V 10/77* | (2022.01) | |
| *G06V 20/64* | (2022.01) | |

(52) U.S. Cl.
CPC .................. *G06T 7/44* (2017.01); *G06T 7/50* (2017.01); *G06T 7/55* (2017.01); *G06T 7/73* (2017.01); *G06T 7/80* (2017.01); *G06V 10/7715* (2022.01); *G06V 20/653* (2022.01); *B60R 2300/30* (2013.01); *B60R 2300/607* (2013.01); *B60R 2300/808* (2013.01); *G05D 2201/0213* (2013.01); *G06T 2207/10028* (2013.01)

(56) References Cited

U.S. PATENT DOCUMENTS

| | | | |
|---|---|---|---|
| 3,290,710 A | 12/1966 | Whitenack, Jr. | |
| 3,599,262 A | 8/1971 | Carder et al. | |
| 4,146,888 A | 3/1979 | Grunewald et al. | |
| 4,279,050 A | 7/1981 | Abbott | |
| 4,692,755 A | 9/1987 | Hahn | |
| 4,727,613 A | 3/1988 | Alten | |
| 4,843,373 A | 6/1989 | Trickle et al. | |
| 4,977,635 A | 12/1990 | Alexander | |
| 5,191,328 A | 3/1993 | Nelson | |
| 5,205,010 A | 4/1993 | Hageman | |
| 5,299,386 A | 4/1994 | Naegelli et al. | |
| 5,396,676 A | 3/1995 | Alexander et al. | |
| 5,440,772 A | 8/1995 | Springer et al. | |
| 5,453,735 A | 9/1995 | Hahn | |
| 5,586,355 A | 12/1996 | Metz et al. | |
| 5,774,920 A | 7/1998 | Alexander | |
| 5,803,701 A | 9/1998 | Filiberti et al. | |
| 5,826,291 A | 10/1998 | Alexander | |
| 5,831,540 A | 11/1998 | Sullivan et al. | |
| 5,881,780 A | 3/1999 | Matye et al. | |
| 6,147,625 A | 11/2000 | Decker | |
| 6,205,721 B1 | 3/2001 | Ashelin et al. | |
| 6,233,885 B1 | 5/2001 | Hoffmann et al. | |
| 6,311,352 B1 | 11/2001 | Springer | |
| 6,329,931 B1 | 12/2001 | Gunton | |
| 6,409,452 B1 | 6/2002 | Zibella et al. | |
| 6,499,169 B2 | 12/2002 | Hahn et al. | |
| 6,502,268 B2 | 1/2003 | Ashelin et al. | |
| 6,634,139 B1 | 10/2003 | Metz | |
| 6,651,581 B2 | 11/2003 | Gauthier | |
| 6,693,524 B1 | 2/2004 | Payne | |
| 6,781,516 B2 | 8/2004 | Reynard et al. | |
| 6,812,849 B1 | 11/2004 | Ancel | |
| 6,880,301 B2 | 4/2005 | Hahn et al. | |
| 6,896,469 B2 | 5/2005 | Alexander | |
| 6,975,226 B2 | 12/2005 | Reynard et al. | |
| 7,045,764 B2 | 5/2006 | Beggs et al. | |
| 7,165,486 B2 | 1/2007 | Alexander et al. | |
| 7,185,463 B2 | 3/2007 | Borgerding | |
| 7,213,285 B2 | 5/2007 | Mitchell | |
| 7,256,703 B2 | 8/2007 | Duvernell et al. | |
| 7,274,300 B2 | 9/2007 | Duvernell et al. | |
| 7,380,375 B2 | 6/2008 | Maly et al. | |
| 7,384,229 B2 | 6/2008 | Gleason | |
| 7,752,696 B2 | 7/2010 | Grunewald et al. | |
| 7,954,606 B2 | 6/2011 | Tinone et al. | |
| 8,065,770 B2 | 11/2011 | Proffitt et al. | |
| 8,307,588 B2 | 11/2012 | Hoffmann et al. | |
| 8,424,254 B2 | 4/2013 | Ballester | |
| 8,443,945 B2 | 5/2013 | Perkins | |
| 8,497,761 B2 | 7/2013 | McNeill et al. | |
| 8,499,897 B2 | 8/2013 | Brooks et al. | |
| 8,547,234 B2 | 10/2013 | Maly et al. | |
| 8,590,087 B2 | 11/2013 | Swessel et al. | |
| 8,596,949 B2 | 12/2013 | Harrington | |
| 8,616,826 B2 | 12/2013 | Cotton et al. | |
| 8,678,736 B2 | 3/2014 | Anderson et al. | |
| 8,733,034 B2 | 5/2014 | Ballester | |
| 8,789,850 B2 | 7/2014 | Kimener et al. | |
| 8,806,689 B2 | 8/2014 | Riviere et al. | |
| 8,838,279 B2 | 9/2014 | Blackwell et al. | |
| 8,890,475 B1 | 11/2014 | Becker | |
| 8,926,254 B2 | 1/2015 | Pocobello et al. | |
| 9,284,135 B2 | 3/2016 | Sveum | |
| 9,290,336 B2 | 3/2016 | Ballester | |
| 9,751,702 B1 | 9/2017 | Hoofard et al. | |
| 9,776,511 B2 | 10/2017 | Brooks et al. | |
| 9,830,825 B2 | 11/2017 | Anstett | |
| 9,845,209 B2 | 12/2017 | Brooks et al. | |
| 9,926,148 B2 | 3/2018 | Stone et al. | |
| 9,938,020 B2 | 4/2018 | Hochstein et al. | |
| 9,950,881 B2 | 4/2018 | Clifford et al. | |
| 10,005,627 B2 | 6/2018 | Bastian, II | |
| 10,081,504 B2 | 9/2018 | Walford et al. | |
| 10,106,342 B2 | 10/2018 | Avalos | |
| 10,696,499 B2 | 6/2020 | Avalos | |
| 10,744,943 B1* | 8/2020 | Jales Costa ............... G06T 7/70 |
| 11,009,604 B1* | 5/2021 | Barish ..................... G01S 17/89 |
| 11,052,944 B2* | 7/2021 | Kabos ..................... G01S 17/42 |
| 11,430,104 B2* | 8/2022 | Barish ................... G06T 7/0004 |
| 2001/0052434 A1 | 12/2001 | Ehrlich et al. | |
| 2003/0145535 A1 | 8/2003 | DiBiase et al. | |
| 2004/0075046 A1 | 4/2004 | Beggs et al. | |
| 2004/0105579 A1* | 6/2004 | Ishii ....................... G06T 7/593 |
| | | | 348/E7.086 |
| 2005/0028723 A1 | 2/2005 | Ancel | |
| 2006/0051196 A1 | 3/2006 | McDonald | |
| 2006/0137261 A1 | 6/2006 | Maly | |
| 2006/0181391 A1 | 8/2006 | McNeill et al. | |
| 2006/0266275 A1 | 11/2006 | DiBiase et al. | |
| 2006/0267745 A1 | 11/2006 | Larson | |
| 2007/0248440 A1 | 10/2007 | Andersen et al. | |
| 2008/0010757 A1 | 1/2008 | Hochstein et al. | |
| 2008/0042865 A1 | 2/2008 | Shepard et al. | |
| 2008/0124203 A1 | 5/2008 | McDonald | |
| 2008/0127435 A1 | 6/2008 | Maly et al. | |
| 2008/0141470 A1 | 6/2008 | Belongia | |
| 2008/0223667 A1 | 9/2008 | Tinone et al. | |
| 2009/0274542 A1 | 11/2009 | Pocobello et al. | |
| 2010/0146719 A1 | 6/2010 | Swessel et al. | |
| 2010/0212170 A1 | 8/2010 | Marsee | |
| 2010/0269273 A1 | 10/2010 | Proffitt et al. | |
| 2011/0075441 A1 | 3/2011 | Swessel et al. | |
| 2011/0203059 A1 | 8/2011 | Whitley et al. | |
| 2011/0219632 A1 | 9/2011 | Odom | |
| 2012/0025964 A1 | 2/2012 | Beggs et al. | |
| 2013/0291455 A1 | 11/2013 | Wiegel et al. | |
| 2013/0320828 A1 | 12/2013 | Nitzsche et al. | |
| 2014/0186146 A1 | 7/2014 | Alan | |
| 2014/0309887 A1 | 10/2014 | Lavoie | |
| 2015/0009046 A1 | 1/2015 | Senfleben et al. | |
| 2015/0047132 A1 | 2/2015 | Sveum et al. | |
| 2015/0047133 A1 | 2/2015 | Sveum | |
| 2015/0375947 A1 | 12/2015 | Hochstein et al. | |
| 2016/0009177 A1 | 1/2016 | Brooks et al. | |
| 2016/0104364 A1 | 4/2016 | Brooks et al. | |
| 2017/0043967 A1 | 2/2017 | Walford et al. | |
| 2017/0341514 A1 | 11/2017 | Brooks et al. | |
| 2017/0341515 A1 | 11/2017 | Brooks et al. | |
| 2017/0341516 A1 | 11/2017 | Brooks et al. | |
| 2017/0368939 A1 | 12/2017 | Brooks et al. | |
| 2018/0031364 A1* | 2/2018 | Kallay ..................... G01B 11/02 |
| 2018/0040103 A1* | 2/2018 | Esparza Garcia ..... G06T 15/503 |
| 2018/0346029 A1 | 12/2018 | Kabos et al. | |
| 2019/0002216 A1 | 1/2019 | Walford et al. | |
| 2019/0064835 A1 | 2/2019 | Hoofard et al. | |
| 2019/0188936 A1 | 6/2019 | Sivill et al. | |
| 2019/0197318 A1* | 6/2019 | Krishnamurthy ..... G06T 7/0008 |

(56) References Cited

U.S. PATENT DOCUMENTS

| | | | |
|---|---|---|---|
| 2019/0197716 | A1 | 6/2019 | Trajkovic et al. |
| 2020/0299077 | A1 | 9/2020 | Harres et al. |
| 2021/0042982 | A1* | 2/2021 | Trajkovic ................ G06T 5/005 |

FOREIGN PATENT DOCUMENTS

| | | |
|---|---|---|
| EP | 1317963 B1 | 6/2003 |
| EP | 2206664 A1 | 7/2010 |
| EP | 2360110 A1 | 8/2011 |
| EP | 2865622 A1 | 4/2015 |
| GB | 2144706 A | 3/1985 |
| WO | WO02070383 A1 | 9/2002 |
| WO | WO2008008699 A1 | 1/2008 |
| WO | WO2009073001 | 6/2009 |
| WO | WO2010064989 A1 | 6/2010 |
| WO | WO2015166339 A1 | 11/2015 |

OTHER PUBLICATIONS

International Search Report with Written Opinion for related Application No. PCT/US2022/024662 dated Jul. 22, 2022, (16 Pages).

"Redacted Proposal Dock Equipment Automation," Jul. 9, 2013, 10 pages.

Crawford, "Crawford Docking Equipment Product Datasheet," last retrieved from [http://www.crawfordsolutions.com.sa/AAES/crawfordsolutionsCOM/EN/Products/Docking/Dock%20levellers/Docking%20equipmenl/1. %20Product% 20datasheel/PD_DEQP_ALL_EN_ORG.pdf] on Jun. 16, 2015, 16 pages.

Application note—Leddar for Loading Dock Vehicle positioning Sensor; Dated Sep. 2013; pulled from leddartech.com on Nov. 8, 2017.

* cited by examiner

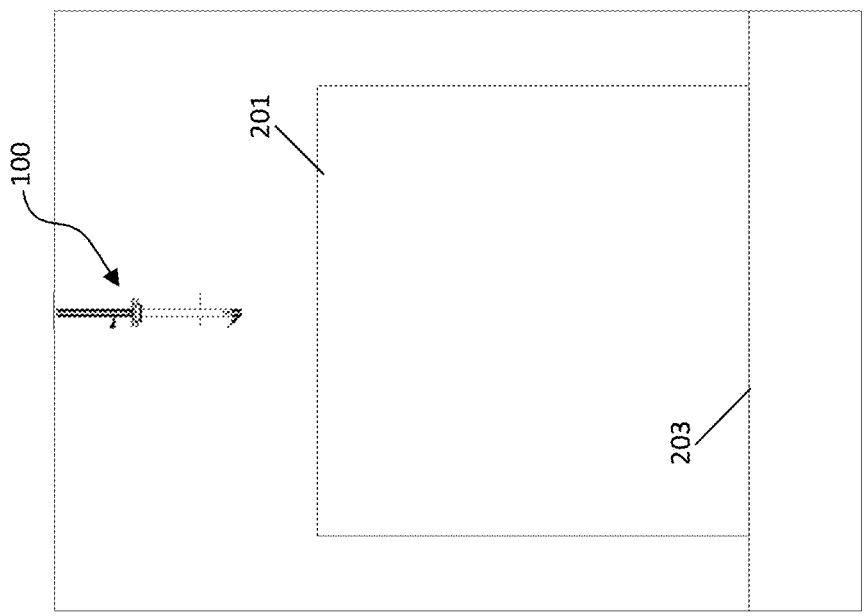
*FIG. 2A*
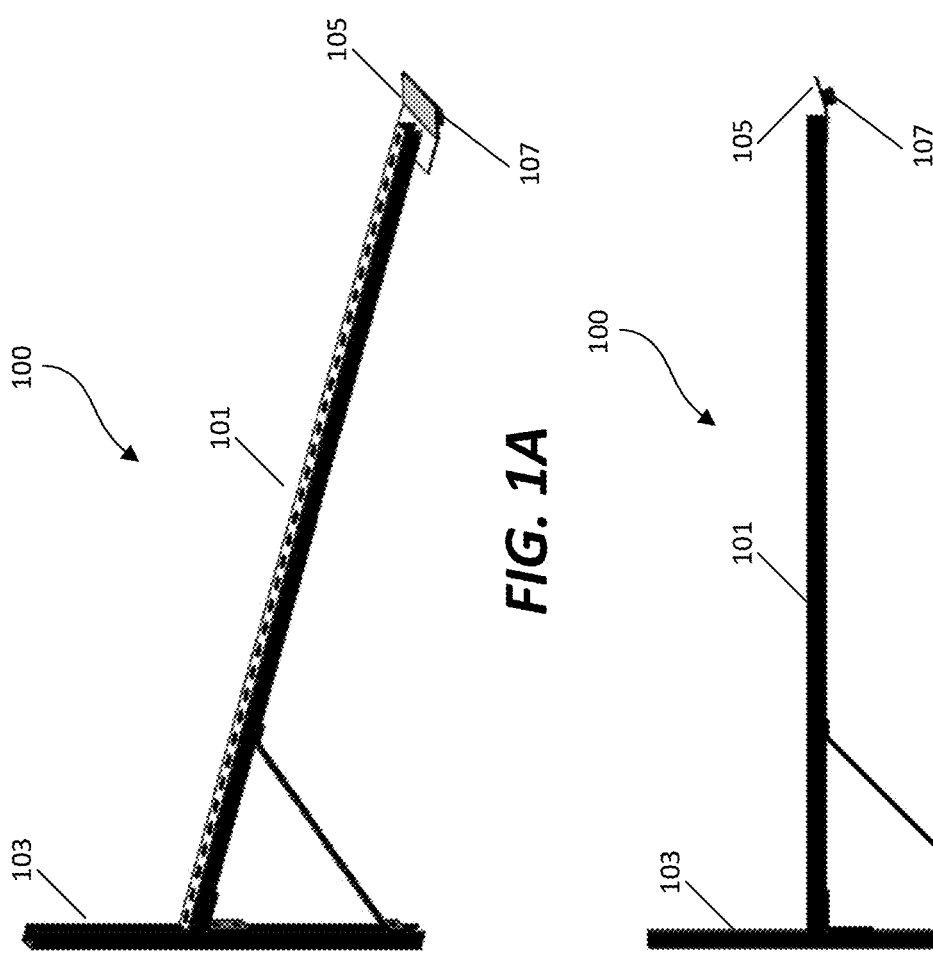
*FIG. 1A*
*FIG. 1B*

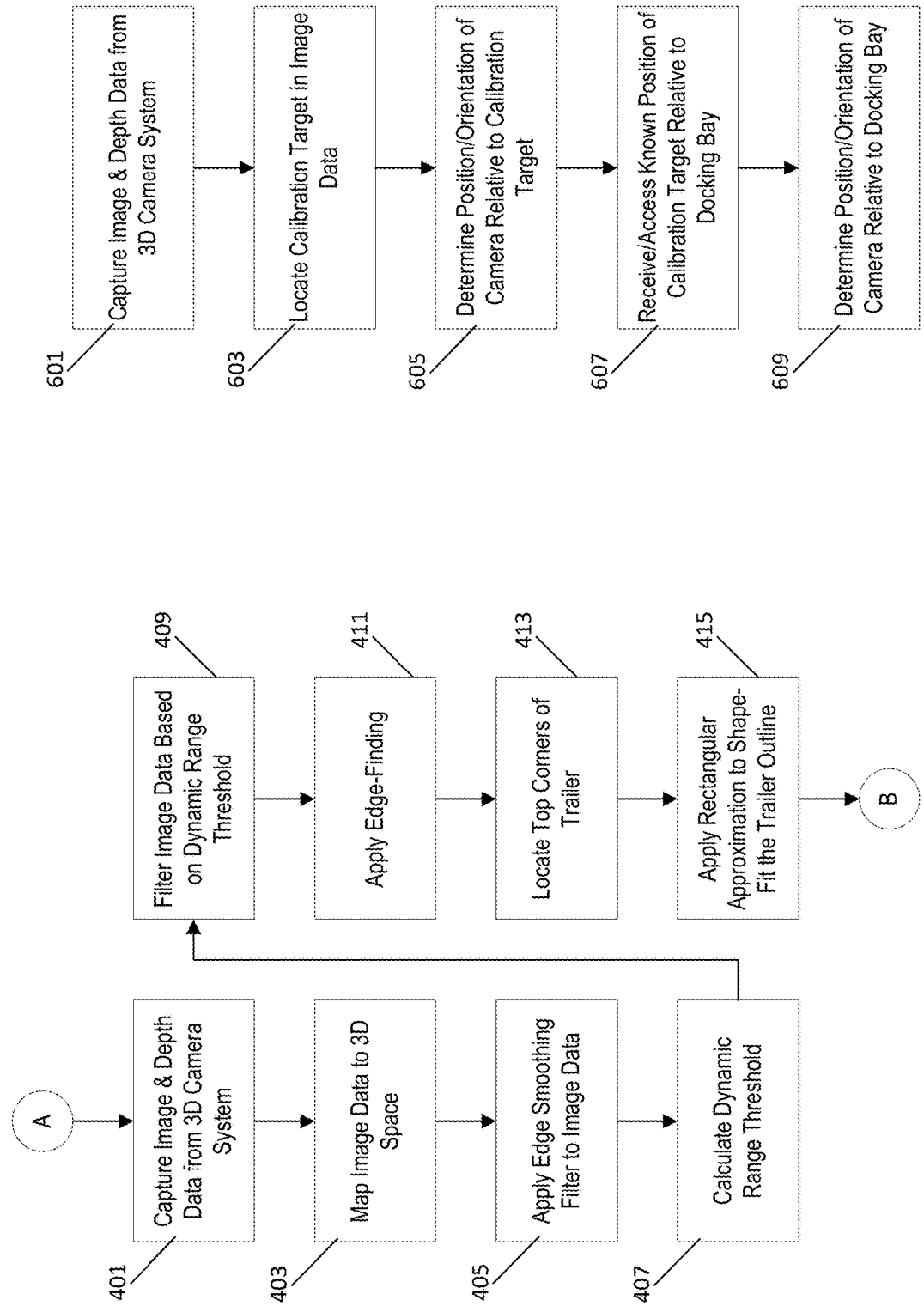

TRAILER ALIGNMENT DETECTION FOR DOCK AUTOMATION USING VISION SYSTEM AND DYNAMIC DEPTH FILTERING

BACKGROUND

The present invention relates to systems and methods for monitoring vehicles including, for example, monitoring vehicles approaching a docking bay door.

SUMMARY

Loading operation in a laser guided vehicles (LGV) operated facility requires that trailer trucks be aligned within a certain tolerance to the center of a door of the facility so that the LGV can enter through the door. Similarly, when a trailer truck is approaching a docking bay door (e.g., for loading and/or unloading of cargo), that the trailer truck be backed towards the docking bay door with the trailer aligned with the center of the docking bay door.

In some implementations, the systems and methods described herein detect and monitor the alignment of a truck parking at a dock door. Computer vision mechanisms including, for example, a three-dimensional (3D) camera, are used to determine the position of a truck approaching the dock door. The determined current position of the truck is compared to known/defined tolerances and, in some implementations, feedback is provided to the driver of the vehicle or personnel at the docking facility. In other implementations, the information obtained and determined by the monitoring of the truck are used to provide information and, in some cases, control signals to automated systems and actuators. In some implementations, the system automatically provides feedback to the driver of the truck in the form of instructions or other indications of how to move the truck in order to align and center the truck with the dock door. In some implementations, the system is configured to provide information to an automatic driving system of the truck that is configured to automatically adjust the position and steering of the vehicle to align and center the truck with the dock door based on the received information and/or control signal instructions.

In some implementations, the systems and methods utilize computer-implemented program and a 3D camera system mounted over a door into the facility or a docking bay door at the facility. In some implementations, the system is configured to provide full-width detection of a truck with the use of relatively few sensors. The system, in some implementations, is configured to perform automatic self-calibration of the camera system and to provide detailed feedback. Additionally, in some implementations, the system is configured to automatically identify the truck from the image data captured by the camera system (e.g., by detecting a license plate or other identifying feature of the truck in the captured image data), to automatically determine whether the rear door of the trailer is opened or closed as the trailer is backed towards the docking bay door, and, if the rear doors are opened, to provide a visual analysis of cargo in the trailer.

In one embodiment, the invention provides a method of determining an alignment of a trailer relative to a docking bay or a vehicle bay door. Image data and position data of a field of view is captured by a 3D camera system. When a trailer is approaching the docking bay or door, the image data includes a top surface of the trailer. A dynamic height range is determined based on an estimated height of the top surface of the trailer in the image data. The dynamic height range includes a range of vertical positions including the estimate height of the top surface of the trailer. A dynamic depth filter is then applied to the captured image data to filter out image data corresponding to heights outside of the dynamic height range. An angular position and/or lateral offset of the trailer is determined based on the depth-filtered image data.

In some implementations, the determined angular position and/or lateral offset of the trailer are used to provide instructions to a driver or to autonomous driving systems to adjust the alignment of the trailer with the docking bay/door. In some implementations, the determined angular position and/or lateral offset are used to generate control inputs for other automated systems. In some implementations, an alarm signal is automatically generated when the determined angular position and/or lateral offset are outside of defined tolerances.

In another embodiment, the invention provides a trailer alignment determination system including a support arm, a 3D camera system, and a controller. The support arm is mounted at a location relative to a docking bay or a vehicle bay door. The 3D camera system is coupled to a distal end of the support arm and is positioned with an at least partially downward-facing field of view. The controller is configured to receive image data and position data from the 3D camera system where the position data indicates positions in 3D space of pixels in the image data. The controller then determines a dynamic height range based on an estimated height of a top surface of a trailer in the image data and applies a dynamic depth filter to filter out image data corresponding to heights outside of the dynamic height range. After applying the dynamic depth filter, the controller determines an angular position of the trailer and/or a lateral offset of the trailer based on the depth-filtered image data.

Other aspects of the invention will become apparent by consideration of the detailed description and accompanying drawings.

BRIEF DESCRIPTION OF THE DRAWINGS

FIG. 1A is a perspective view of a camera system according to one implementation.

FIG. 1B is a side elevation view of the camera system of FIG. 1A.

FIG. 2A is an elevation view of a docking bay equipped with the camera system of FIGS. 1A and 1B.

FIG. 4A is a flowchart of a method of determining a position and orientation of a trailer approaching the docking bay using the camera system of FIG. 1A and the control system of FIG. 3.

FIG. 6 is a flowchart of a method of self-calibrating the camera system of FIG. 1A using the control system of FIG. 3.

DETAILED DESCRIPTION

Figure 2B:
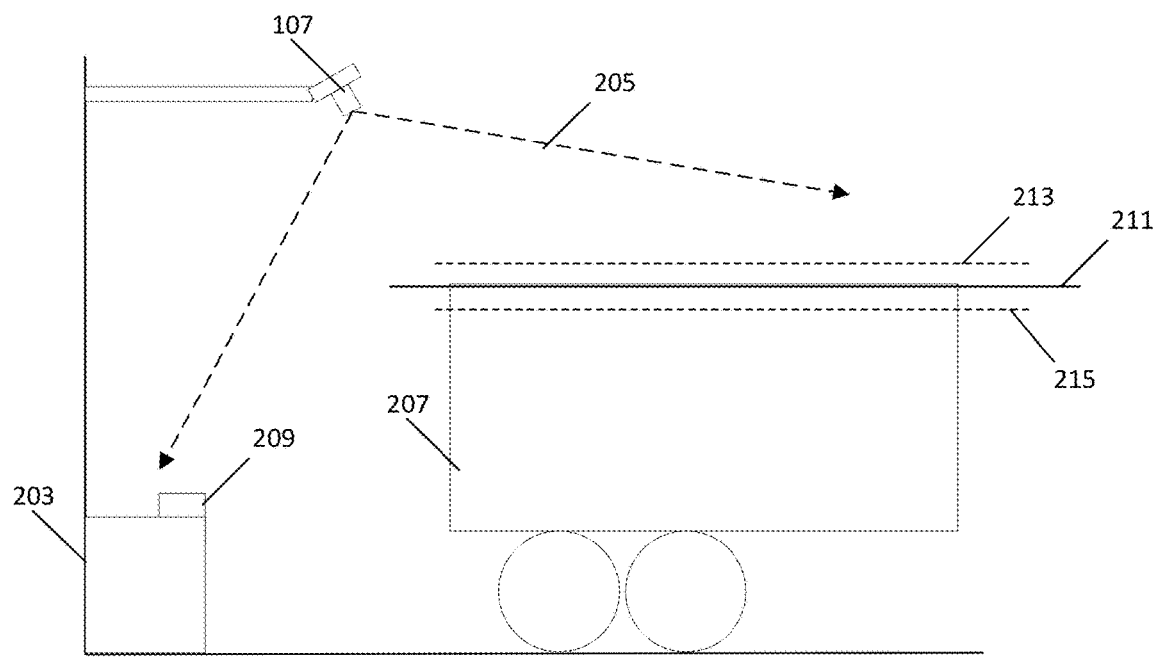
FIG. 2B is a side view of the docking bay of FIG. 2A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1A and 1B illustrate an example of a camera and mounting system 100 for capturing image data of a vehicle (e.g., a trailer truck) approaching a door or a docking bay. The system includes a support arm 101 extending horizontally from an adjustable height bracket 103. In this example, the bracket 103 is mounted to a wall and the height of the support arm 101 can be adjusted relative to the bracket 103. At a distal end of the support arm 101, a camera support 105 couples a 3D camera 107 to the support arm 101. In some implementations, the 3D camera 107 is positioned facing directly downward to capture overhead image data of a vehicle passing below the 3D camera 107. However, in the example of FIGS. 1A and 1B, the camera support 105 positions the 3D camera 107 at a slight angle relative to vertical so that the 3D camera 107 can capture image data of the top of an approaching vehicle and also capture image data of a front and/or rear side of an approaching vehicle (as described in further detail below).

FIGS. 2A and 2B illustrate an example installation of the camera and mounting system 100. This example illustrates a docking bay for a trailer truck with a docking bay door 201 and a raised docking platform 203. The camera and mounting system 100 are mounted above a docking bay door 201 with the support arm 101 extending perpendicularly from the wall. As illustrated in the side-view of FIG. 2B, a trailer 207 of a truck is being operated in reverse towards the docking platform 203 for loading and/or unloading of cargo. The positioning of the 3D camera 107 provides an imaging field of view 205 that captures image data of the top/roof of the trailer 207, a rear of the trailer 207 (e.g., the rear cargo doors, the rear bumper, license plate, etc.), and also at least some objects and/or markings on the docking platform 203. However, in other implementations, the 3D camera 107 may be positioned, oriented, and/or configured to provide a different field of view (e.g., by positioning the camera to facing directly downward instead of at a slight angle relative to vertical).

FIG. 2B also illustrates a calibration target 209 positioned on the docking platform 203. As described in further detail below, the calibration target 209 may include an object, a structure, or another marking (e.g., a symbol affixed in paint) that is of a known size and is at a known position relative to the docking bay door 201. For example, in some implementations, the calibration target may be a part of the docking bay door itself (e.g., one or both of the side tracks of an overhead door). In some implementations, the position and size of the calibration target are known and/or predefined based on the manufacture of the docking bay door 201. In other implementations, the calibration target is positioned and a user/technician provides information to the camera system regarding the relative location of the calibration target 209. Also, although the calibration target 209 is shown in the example of FIG. 2B as positioned on the docking platform 203, in some other implementations, the calibration target 209 may be positioned at a different location including, for example, on the road surface in front of the docking platform 203.

As illustrated in the example of FIG. 2B, the calibration target 209 is positioned within the field of view 205 of the 3D camera 207. As described in further detail below, in some implementations, the 3D camera system is configured to use the calibration target 207 to self-calibrate in order to determine a position and orientation of its field of view 205 relative to the docking bay door 201. Accordingly, the 3D camera system is then able to determine the position and orientation of other objects within the field of view 205 of the 3D camera 107 relative to the docking bay door 201.

Figure 3:
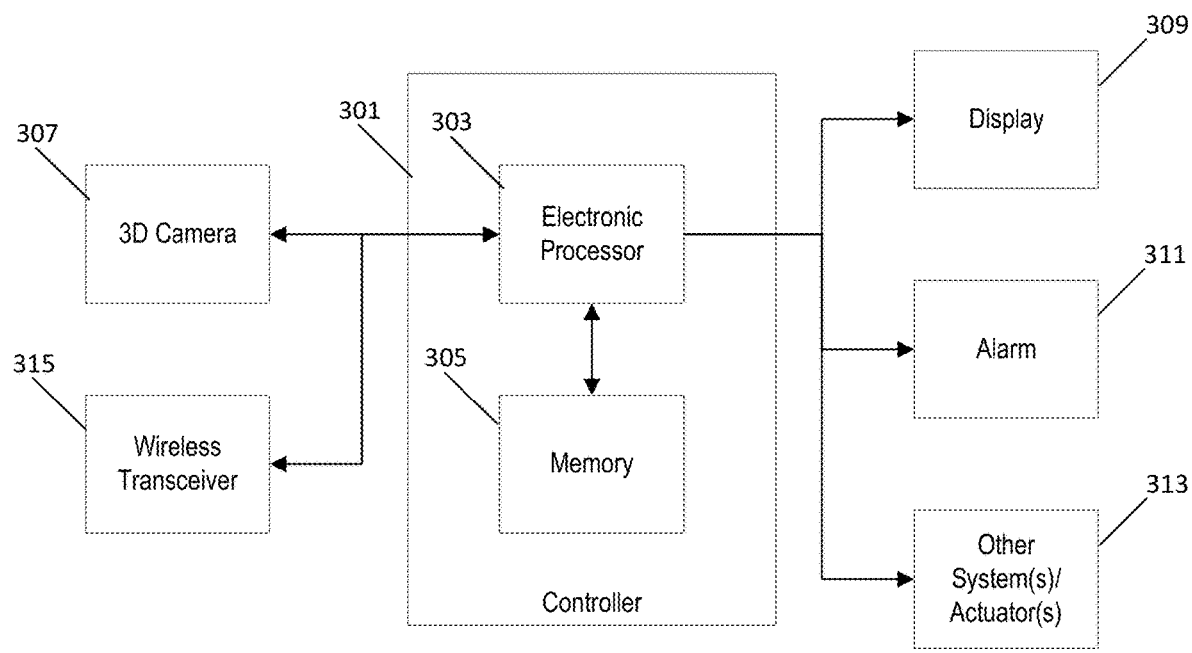
FIG. 3 is a block diagram of a control system for the camera system of FIGS. 1A and 1B.

FIG. 3 illustrates an example of a control system for a position/orientation monitoring system using the 3D camera such as illustrated in the examples of FIGS. 1A through 2B. A controller 301 includes an electronic processor 303 communicatively coupled to a non-transitory computer-readable memory 305. The memory 305 stores data and instructions that, when executed by the electronic processor 303, provide functionality of the controller 301 (including, for example, the functionality described herein). The electronic processor 303 is also communicatively coupled to a 3D camera 307, a display 309, and an alarm 311.

The 3D camera 307 is a camera configured to capture image data and to provide both image and depth information to the electronic controller 303. For example, in some implementations, the 3D camera 307 includes at least two cameras and a projector. The projector of the 3D camera 307 projects a structured light pattern onto surfaces within the field of view of the 3D camera 307 and the two cameras capture stereo image data of the surfaces and the projected structured light pattern. Based on predefined knowledge of the structured light pattern and the appearance of the structured light pattern in the captured image data, the 3D camera is able to determine a location in 3D space for each pixel of the captured image data.

In some implementations, the electronic processor 303 is configured to cause the display 309 to provide image, graphic, and or text output to a user on the display 309. For example, in some implementations, the electronic processor 303 is configured to cause the display 309 to display image data of the top surface of a trailer approaching the docking bay with additional graphical information overlaid onto the image of the trailer. For example, the electronic processor 303 may cause a rectangular outline of the trailer and/or a graphical indication of a center line of the trailer to be displayed overlaid onto the image data on the display 309. In some implementations, the electronic processor 303 causes the display 309 to provide a graphical user interface (GUI) and also receives user inputs from a user input device (e.g., a mouse, a keyboard, and/or a touch-sensitive display screen).

As discussed further below, the controller 301 is configured to determine an alignment of an approaching trailer relative to the docking bay. In some implementations, the controller 301 is also configured to generate an alarm condition in response to determining that the current alignment of the trailer relative to the docking bay exceeds a defined tolerance (e.g., the trailer is not sufficiently aligned with the docking bay as it approaches). In some implementations, the electronic processor 303 is configured to detect this alarm condition and to cause a notification of the trailer misalignment on the display 309. In some implementations, the system may include another alarm device 311 in addition to or instead of displaying the notification on the display 309. For example, the alarm 311 may include a speaker configured to output an audible alarm in response to an alarm signal generated by the electronic processor 303 and/or a light configured to emit a visible light (e.g., a solid colored light, a flashing light pattern, etc.) in response to the alarm signal.

Additionally, in some implementations, the electronic processor 303 is communicatively coupled to other systems and/or actuators 313 and configured to generate data and/or control signals to the other systems/actuators 313. For example, in an automated or partially automated facility, the electronic processor 303 may be configured to generate a control signal instruction to an automatic loading/unloading system (e.g., a lifting device, a conveyor, etc.) in response to identifying an approaching truck/trailer and/or the determined position/alignment of the trailer. In some implementations, the truck approaching the docking bay may include an autonomous or semi-autonomous vehicle and the electronic processor 303 may be configured to transmit data or control signals to the vehicle based on a detected position/orientation of the trailer relative to the door/docking bay and to cause the vehicle to adjust its position as it continues its approach.

Finally, in some implementations, the controller 301 either includes or is communicatively coupled to a wireless transceiver 315 (e.g., a Wi-Fi transceiver, a cellular antenna) or another digital communication device. The digital communication device (e.g., the wireless transceiver 315) allows the controller 301 to communicate with other computer systems including, for example, a remote transportation/logistic server for tracking cargo and transportation vehicles. In some implementations, the controller 301 is configured to use the wireless transceiver 315 to communicate with one or more systems or controllers of the approaching vehicle. For example, the controller 301 may transmit image data to the vehicle that is then displayed on a user display within an operator cab of the vehicle (such as, for example, the image data and user interface elements discussed above in reference to display 309), it may transmit alarm notifications to the vehicle to cause a visual or audible alarm to be activated within the operator cab of the vehicle (e.g., indicating a misalignment of the trailer relative to the docking bay), and/or it may transmit control signals or data to cause an autonomous driving system of the vehicle to automatically correct a position/alignment of the vehicle/trailer relative to the docking bay.

The electronic controller 301 is configured to receive image and depth/3D position data from the 3D camera 307, to determine a relative position/alignment of an approaching vehicle based on the captured data from the 3D camera 307, and to determine whether the relative position/alignment is within a defined tolerance range. In some implementations, the electronic controller 301 is also configured to perform additional functions based on the determined position/alignment including, for example, outputting an alarm signal in response to determining that the position/alignment exceeds the defined tolerance.

FIGS. 4A through 4D illustrate various examples of methods performed by the controller 301 to capture/process the image data and provide functionality based on the analysis of the image data. Beginning in FIG. 4A, the controller 301 receives image and depth data captured by the 3D camera 307 (step 401). In some implementations, the 3D camera 307 is configured to captured & process image data and provides a three-dimensional mapping of the captured image data to the controller 301. In other implementations, the 3D camera 307 provides raw image data to the controller 301 and the controller 301 is configured to process the captured image data to determine an appropriate 3D mapping (step 403). The controller 301 also applies an edge smoothing filter to the image data (step 405).

To isolate the shape of the top/roof of the trailer from the rest of the captured image data, the controller 301 first calculates a dynamic range threshold corresponding to the height of the top of the trailer (step 407) and filters the image data based on the dynamic range threshold (step 409). The controller 301 is configured to determine the dynamic range threshold by estimating a height of the trailer in the 3D coordinate space.

In some implementations, the controller 301 is configured to estimate the height of the trailer based on the captured image data. For example, the controller 301 may be configured to capture and/or store a template depth frame of the area within the field of view of the 3D camera 307 without a trailer at or approaching the docking bay. The depth frame includes a 2D array indicating the vertical position/depth of the highest image pixel in each vertical column of the 3D mapped image data (e.g., a "depth" of the highest image pixel from an overhead/top-down perspective). The 3D camera 307 will detect new objects entering the field of view of the 3D camera 307 by comparing a depth frame of a new captured/mapping 3D image to the template depth frame. When a new object is detected, the "height" of the new object is estimated by calculating an average "depth" of pixels in the depth frame corresponding to the new object. In some implementations, the controller 301 is configured to calculate the height of the new object as the average depth of all pixels in the depth frame corresponding to the new object while, in other implementations, the controller 301 is configured to calculate the height of the new object as the average depth of a smaller subset of pixels corresponding to the new object.

In addition to or instead of using the captured 3D image data to determine a height of the approaching trailer, in some implementations, the controller 301 is configured to determine a height of the trailer by accessing stored information about the approaching trailer on a computer system. For example, in some implementations, the controller 301 may be configured to identify the trailer based on a wireless signal received from the approaching trailer or, as described in further detail below, based on image analysis of a license plate or other identifying notations on the approaching trailer. In some such implementations, the controller 301 may be configured to determine the height of the trailer by identifying the trailer and accessing stored height information for the trailer from a computer system.

Once the height of the new object (e.g., the trailer) is determined, a dynamic range is defined based at least in part on the determined height. FIG. 2B illustrates an example of the determined dynamic range for the trailer 207 approaching the docking bay. In the example of FIG. 2B, line 211 indicates the determined height of the top of the trailer 207. The dynamic range is defined as including all pixels within a defined distance above and below the trailer height 211. In FIG. 2B, the maximum height of the dynamic range is indicated by line 213 and the minimum height of the dynamic range is indicated by line 215. In some implementations, the maximum and minimum of the dynamic range are defined as a pre-defined distance above and below the determined average height of the trailer. In some implementations, the width of the dynamic range may be tuned or adjusted (i.e., automatically, semi-automatically, or manually in various implementations) to optimize the system for operating variables including, for example, the position/orientation of the camera and the incline of the road surface approaching the docking bay. In other implementations, the controller 301 may be configured to determine a width of the dynamic range dynamically based on the captured image data. For example, in implementations where the height of the trailer is determined based on an analysis of a depth frame (as discussed above), the controller 301 may be configured to determine a dynamic range that is defined to include the highest and the lowest pixels corresponding to the top of the trailer in the depth frame.

Once the dynamic range threshold is defined by the controller (step 407), the 3D mapped image data is filtered based on the defined dynamic range threshold (step 409) to remove all image data outside of the defined dynamic range (e.g., by setting the color value of the pixel to a defined "blank" color). In some implementations, the controller 301 is configured to use the dynamic range filtering to generate a binary image where all image data pixels detected within the dynamic range are reset to a first color (e.g., black) and all image data pixels detected outside of the dynamic range are reset to a second color (e.g., white).

The controller 301 then applies an edge-finding algorithm to find a contour (e.g., outline) of the top of the trailer (step 411) and, based on the defined outline, to determine the location of each top corner of the trailer within the field of view of the 3D camera 307 (step 413). Based on the assumption that the top of the trailer will have a rectangular shape, the controller 301 then applies a rectangular approximation to shape-fit the trailer outline (step 415). In some implementations, the edge-finding algorithm and the rectangular approximation are applied to the image data in 3D space. However, in some implementations, to reduce computational complexity, a downward facing two-dimensional image frame is generated after the dynamic range filtering (e.g., where the color of each pixel is defined based on whether a vertical column in the 3D space includes any image data within the dynamic range) and the edge-finding algorithm (step 411), the locating of the top corners of the trailer (step 413), and the rectangular approximation (step 415) are all applied only to the two-dimensional image frame.

Figure 4B:
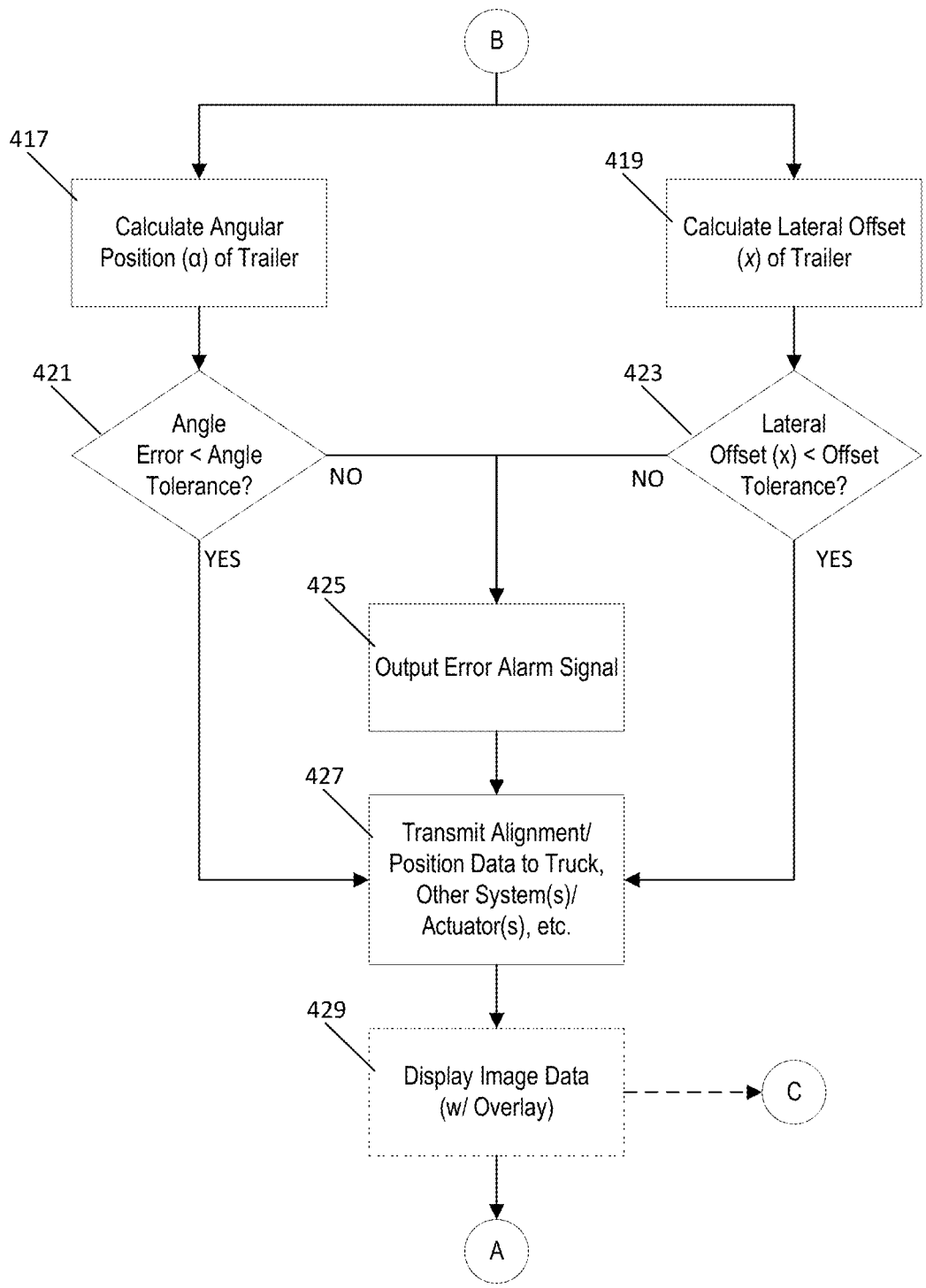
FIG. 4B is a flowchart of a method of determining whether the approaching trailer is within alignment tolerance thresholds using the camera system of FIG. 1A and the control system of FIG. 3.
Figure 5A:
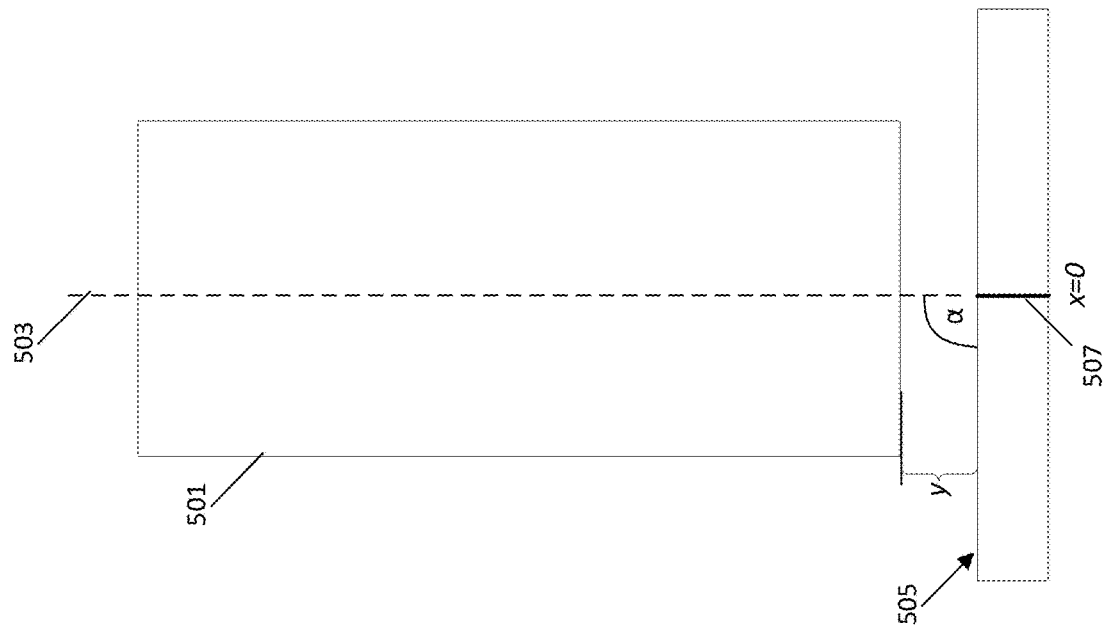
FIG. 5A is a schematic overhead view of a first example of a trailer approaching a docking bay, where the trailer is not in alignment with the docking bay.
Figure 5B:
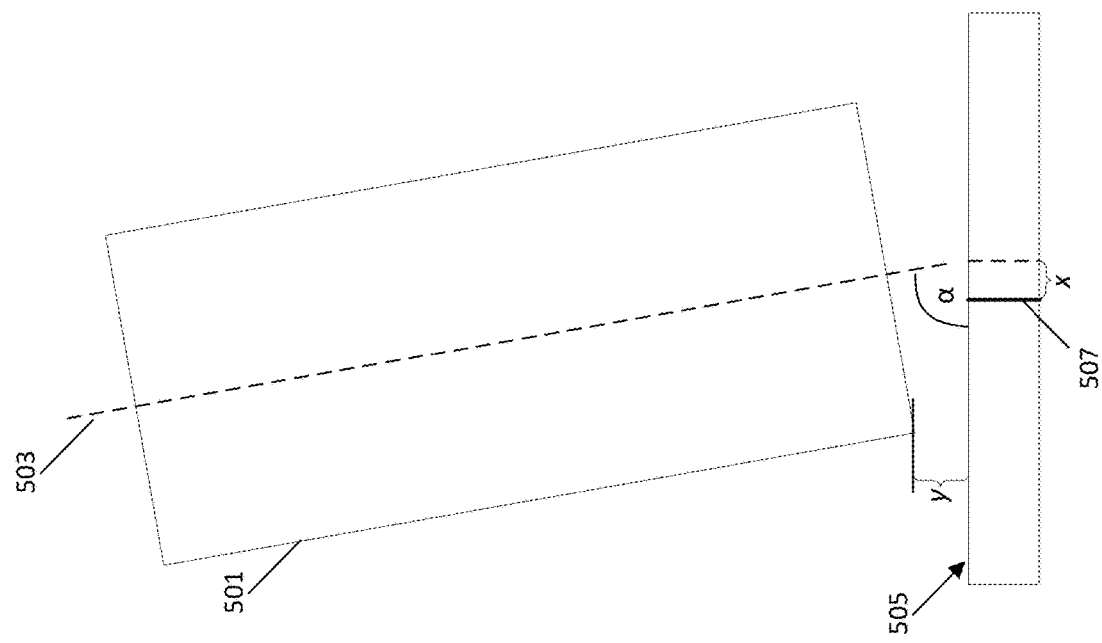
FIG. 5B is a schematic overhead view of a second example of a trailer approaching a docking bay, where the trailer is in alignment with the docking bay.

Once the outline of the top of the trailer is determined (in the 3D coordinate space or in a single horizontal 2D plane), the controller 301 then calculates an angular position of the trailer (step 417) and a lateral offset of the trailer (step 41), as illustrated in the example of FIG. 4B. In some implementations, the controller is configured to calculate the angular position and lateral offset of the trailer by first calculating a centerline of trailer outline (determined in step 415 of FIG. 4A). As illustrated in the examples of FIGS. 5A and 5B, the centerline 503 is calculated as a line in a horizontal 2D plane (or in 3D space) that extends along a center of the trailer outline 501 in a direction parallel to the length of the trailer. After determining the outline 501 of the top of the trailer in the captured image data (using the method of FIG. 4A) and determining the centerline 503, the controller 301 calculates the angular position α of the trailer as the angle between the centerline 501 and a front edge 505 of the docking bay. The controller 301 also calculates the lateral offset x of the trailer as a lateral distance between a center point 507 of the docking bay and a point at which the centerline 503 of the trailer outline 501 intersects the front edge 505 of the docking bay. In some implementations, the controller 301 is also configured to calculate a distance y between the front edge 505 of the docking bay and the nearest point of the trailer outline 501.

In the example of FIG. 5B, the trailer outline 501 is positioned in alignment with the docking bay. The angular position α is 90° (e.g., the centerline 503 is perpendicular to the front edge 505 of the docking bay) and the lateral offset x is 0. In contrast, in the example of FIG. 5A, the angular position α is a less than 90° and the lateral offset x is greater than 0. In some implementations, perfect alignment between the trailer and the docking bay is not required. However, the alignment must be close enough to allow cargo to be loaded/unloaded and to avoid collisions between the truck/trailer and any nearby structures. Accordingly, in some implementations, the controller 301 defines an angle tolerance and an offset tolerance. The angle tolerance defines a magnitude of deviation from the 90° that is allowed for the angular position α. The offset tolerance defines a magnitude of deviation that is allowed between the centerline 503 of the trailer and the center point 507 of the docking bay. For example, in some implementations, the angle tolerance is defined as +/−1° from perpendicular and the offset tolerance is defined as +/−4 inches.

Returning now to FIG. 4B, after calculating the angular position α of the trailer (step 417) and the lateral offset x of the trailer (step 419), the controller 301 compares these calculated metrics against the defined tolerance thresholds. In particular, the controller 301 compares a calculated angle error (i.e., a magnitude of a difference between 90° and the calculated angular position α) to the angle tolerance threshold (step 421) and compares the lateral offset x to the offset tolerance threshold (step 423). If either comparison exceeds the respective tolerance threshold, then the controller 301 determines that a misalignment error condition is present and outputs an error alarm signal (step 425). As discussed above, in some implementations, the error alarm signal can, for example, cause an error notification to be displayed on one or more display screens and/or can cause the activation of one or more audible/visual alarm devices. Also, in some implementations, the controller 301 may be configured to transmit the alignment/position data determined for the trailer to the truck, to a user interface, and/or to other system(s)/actuator(s) (step 427). For example, in some implementations, the controller 301 is configured to cause a display screen (e.g., display 309) to display an overhead image of the trailer (based on the image data captured by the 3D camera 307) with the determined outline 501 of the trailer and/or the centerline 503 overlaid onto the image of the trailer (step 429). In some implementations, the controller 301 causes the display screen to also provide a numeric or graphical indication of metrics including, for example, the angular position α, the angle error, the lateral offset x, and/or the distance y. Furthermore, in some implementations, the controller 301 is configured to provide instructions to a driver of the truck to guide the driver into alignment within the defined tolerances.

Figure 4D:
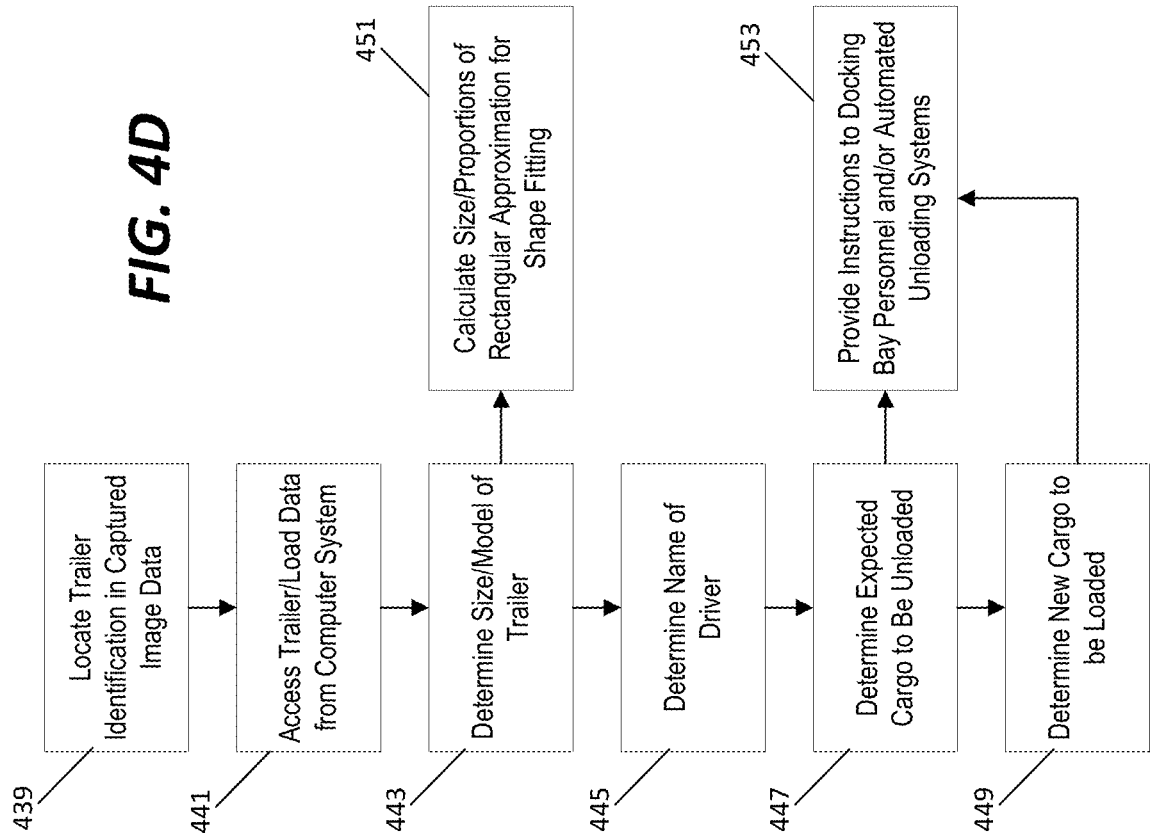
FIG. 4D is a flowchart of a method of accessing additional information about the approaching trailer based on captured image data using the camera system of FIG. 1A and the control system of FIG. 3.
Figure 4C:
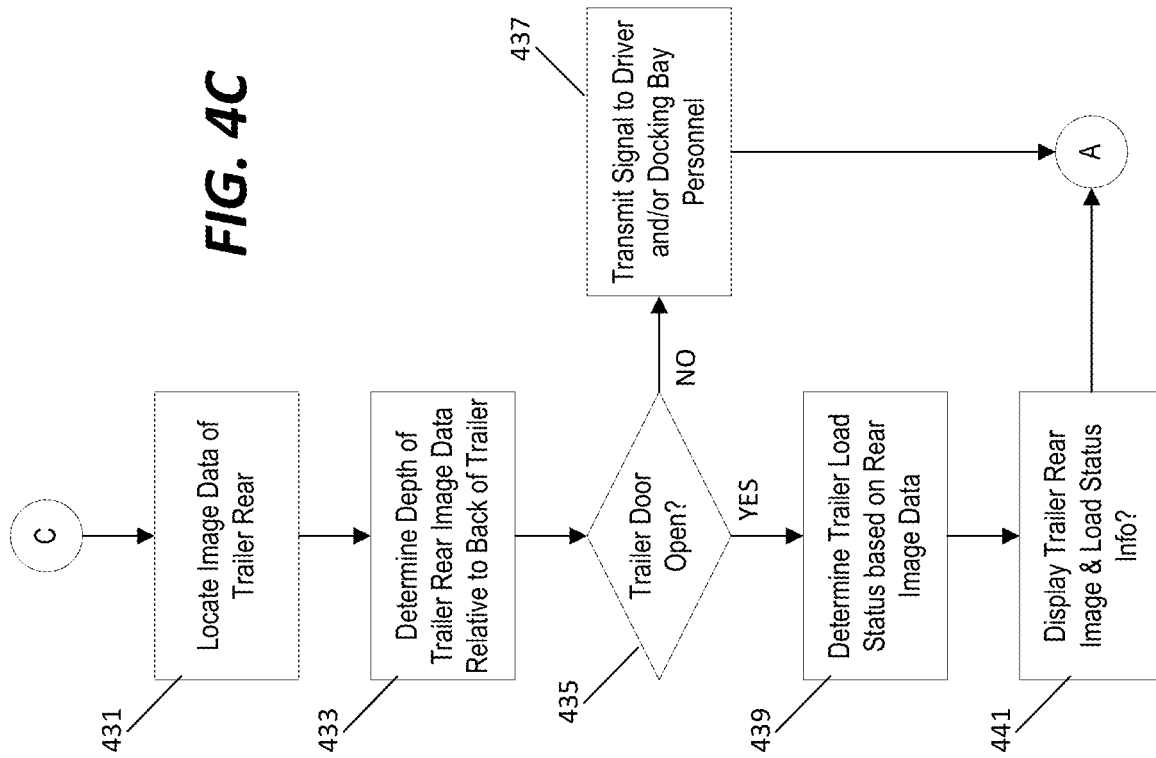
FIG. 4C is a flowchart of a method monitoring a rear door of the approaching trailer using the camera system of FIG. 1A and the control system of FIG. 3.

The methods illustrated in FIGS. 4A and 4B focus primarily on image data of the top of the trailer. However, as discussed above, the controller 301 in some implementations may be configured to analyze image data corresponding to other surface/perspectives including, for example, image data corresponding to the rear of the trailer. As illustrated in the example of FIG. 4C, the controller 301 may be configured to process the captured image data to identifying a set of pixels in the 3D mapped image data that correspond to a rear of the trailer (step 431). For example, in some implementations, the controller 301 may be configured to locate the image data corresponding to the rear of the trailer after identifying the outline of the top of the trailer by applying region growing and/or edge finding techniques that extend from the rear edge of the outline of the top of the trailer.

In some implementations, the controller 301 is configured to use this portion of the 3D mapped image data to determine whether the rear door of the trailer is opened. For example, if the controller 301 determines that the 3D mapped image data includes any image data mapped to locations beyond the rear of the trailer and within a defined distance below the top of the trailer (i.e., image data for locations that would be inside the trailer) (step 433), then the controller 301 determines that the rear door of the trailer must already be opened (step 435). Conversely, if the 3D mapped image data includes a set of adjacent image pixels in a vertical plane extending downward from the rear edge of the outline of the top of the trailer (step 433), then the controller 301 determines that the rear door of the trailer is closed (step 435).

In some implementations, the controller 301 is configured to respond to a determination that the trailer door is closed by transmitting a notification signal (e.g., to a graphical user interface screen in the truck or in the docking bay area) instructing the driver and/or docking bay personnel to open the rear door of the trailer (step 437). Alternatively, or additionally, in some implementations, the controller 301 may be configured to transmit control signals to one or more actuators to control automated (or semi-automated) equipment based on whether the rear door of the trailer is closed. For example, the trailer may be equipped with actuators for automatically opening and closing the rear doors of the trailer. In some such implementations, the controller 301 is configured to respond to the determination that the trailer door is closed by transmitting a control signal to the rear door actuators of the trailer causing the trailer doors to automatically open in response.

Also, in some implementations, the controller 301 may be configured to respond to a determination that the trailer door is closed by applying image processing techniques to a portion of the interior of the trailer that is within the unobstructed field of view of the 3D camera. For example, the controller 301 may be configured to determine a load status of the trailer based on captured image data of the interior of the trailer (e.g., whether the trailer is currently loaded, how much space remains in the trailer, where cargo is currently positioned within the trailer, etc.) (step 439). In some such implementations, the controller 301 is configured to utilize the load status information determined based on the image analysis of the interior of the trailer to display information to the driver of the truck and/or docking bay personnel on a display screen (step 441) and/or to control the operation of one or more autonomous or semi-autonomous systems for loading/unloading cargo.

In some implementations, the controller 301 is configured to repeat the steps described above in reference to FIGS. 4A, 4B, and 4C with newer image data as the vehicle/trailer continues its approach. In some implementations, the controller 301 is configured to cause the 3D camera 307 to capture new image/depth data and repeats the image analysis according to a defined period. In other implementations, the 3D camera is configured to capture image/depth data at a defined frame rate (e.g., a defined frequency) and, upon completing analysis of one captured 3D image frame, the controller 301 accesses the most recent image/depth data frame captured by the 3D camera 307 and repeats the analysis.

Finally, as noted above, in some implementations, the controller 301 may be configured to analyze the captured image data in order to access other identifying information about the approaching trailer and/or vehicle. FIG. 4D illustrates one example of a method performed by the controller 301 for accessing trailer-specific information stored on a computer system (e.g., a cloud-based transportation and logistics system). The controller 301 analyzes the captured image data to locate a unique indicator of trailer identification on the body of the trailer (step 439). For example, the controller 301 may be configured to determine the identity of the trailer based on image data of a license plate on the trailer, an alphanumeric code printed on or affixed to the body of the trailer (e.g., on the side, rear, or top of the trailer), or a digital code (e.g., a QR code) printed on or affixed to the body of the trailer. Once the unique indicator of trailer identification has been located in the captured image data (step 439), the controller uses the unique indicator to access trailer-specific information from a computer system including, for example, data identifying the size/model of the trailer (step 443), the identity of the driver of the truck (step 445), a listing of the cargo to be unloaded from the trailer (step 447), and a listing of new cargo to be loaded onto the trailer (step 449).

As noted above, in some implementations, the controller 301 may be configured to use the trailer-specific information identifying the size/model of the trailer to determine a height of the trailer (for purposes of the dynamic range image filtering) and to calculate the appropriate size/proportions of the top of the trailer for the rectangular approximation used to determine the outline of the top of the trailer (step 451).

Additionally, the controller 301 may be configured to use the accessed information regarding the cargo to be unloaded from the trailer and/or new cargo to be loaded onto the trailer in order to provide instructions to docking bay personnel and/or automated loading/unloading systems (step 453). For example, in some implementations, this information accessed from the computer system may also include a loading map of the interior of the trailer identifying (a) a location of a particular cargo to be unloaded from the trailer and/or (b) a location in the trailer where the new cargo is to be loaded. In implementations where the cargo is loaded/unloaded by automated systems, the accessed loading map can be used to guide the automated systems. In implementations where the cargo is loaded/unloaded manually by docking bay personnel, the controller 301 may be configured to cause the display 309 to provide graphical instructions to guide the docking bay personnel even while the trailer is still approaching the docking bay. For example, the controller 301 may be configured to provide an output indicating a location in a warehouse (or in the docking bay area) of the new cargo to be loaded onto the trailer so that the docking bay personnel can prepare the new cargo for loading. The controller 301 may also be configured to provide a graphical indication on the display 309 of a location on the trailer where the new cargo is to be loaded (e.g., a position relative to other cargo already loaded onto the trailer). In situations where cargo is to be unloaded from the trailer, the controller 301 may be configured to provide a graphical indication on the display 309 of the location in the trailer of the cargo to be unloaded and, when applicable, the location of cargo that is to remain on the trailer. In some implementations, the system is also configured to analyze the captured 3D image data to evaluate trailer floor quality and to determine whether any obstructions or debris is present in the trailer. In some such implementations, the system is configured to generate an alarm signal in response to determining that obstructions or debris are present on the trailer floor.

The methods of FIGS. 4A, 4B, and 4C are illustrated as a loop that is repeated for multiple different image frames as the trailer approaches. In some implementations, the method of FIG. 4D may also be repeated multiple times. Alternatively, in some implementations, the method of FIG. 4D is performed only once for each approaching trailer. For example, the controller 301 may be configured to analyze the captured image data with each repeated iteration of the method of FIG. 4A until the unique indicator of the trailer identification is detected in the captured image data and then, after the unique identifier has been located in the image data, the trailer-specific information is accessed from the computer system and the controller no longer attempts to locate the unique identifier for any subsequent image frames until a new trailer approaches the docking bay.

The mechanisms described in the examples above operate to determine a location and orientation of a vehicle/trailer in the image/depth date captured by the 3D camera. Accordingly, in some implementations, these mechanisms operate to determine a location and orientation of the vehicle/trailer relative to a 3D coordinate frame defined by the position and orientation of the 3D camera and, in order to determine the position and orientation of the vehicle/trailer relative to a door/docking bay, the controller 301 must also know the position of the door/docking bay relative to the same 3D coordinate frame. As described above in reference to FIG. 2B, in some implementations, controller 301 is configured to self-calibrate to determine a position of the door/docking bay relative to the 3D coordinate frame of the 3D camera 307 using a calibration target.

One example of a self-calibration process that is performed by the controller 301 in some implementations is illustrated in FIG. 6. The controller 301 captures image and depth data from the 3D camera 307 (step 601) and analyzes the captured data to detect a calibration target (e.g., calibration target 209 in FIG. 2B) in the captured image data (step 603). The controller 301 then determines the position and orientation of the 3D camera 307 relative to the calibration target by determining the position and orientation of the calibration target in the 3D coordinate frame of the 3D camera 307 (step 605). In some implementations, the controller 301 is configured to detect the calibration target by mapping the image data into 3D space and then applying an image search algorithm (e.g., edge finding followed by shape fitting) to detect an object in the mapped 3D image data that matches the known size/shape of the calibration target. In other implementations, the system is configured to detect the calibration target in the original image data captured by the 3D camera (prior to mapping the image data to the 3D coordinate space) and then determining a location of the calibration target in the 3D coordinate frame based on the apparent size and shape of the calibration target in the original image data. Additionally, in some implementations, the calibration target itself includes a unique visual characteristic that enables it to be more easily detected in the image data. For example, the calibration target may have a unique color that is distinguished from other objects and surfaces in the docking bay area or may be covered in a reflective material, so that color and/or brightness filtering may be applied to the captured image data to locate the calibration target.

The location and orientation of the calibration target relative to the door/docking bay is known or, in some implementations, is determined manually and provided as a user input to the controller 301. For example, in some implementations, when installing the 3D camera 307, a technician may also install the calibration target at a location within the field-of-view of the 3D camera 307, then measure a position/orientation of the installed calibration target relative to a specific point of the docking bay (e.g., the center point 507 on the front edge 505 of the docking bay), and provide the measurement as input to the controller 301 through a user interface. In other implementations, the calibration target may be incorporated directly into the structure of the docking bay door (e.g., in some implementations, the side tracks of an overhead door may be used as the calibration target).

Returning to FIG. 6, after detecting the calibration target in the captured image data (step 603) and determining the position/orientation of the calibration target in the 3D coordinate system of the 3D camera 307 (step 605), controller then accesses or receives as input the known (or previously determined) position & orientation of the calibration target relative to the docking bay (step 607) and, thereby, determines a position/orientation of the docking bay relative to the 3D coordinate frame used by the 3D camera 307 (step 609). Accordingly, by determining the position/orientation of the docking bay (e.g., a center point 507 of the docking bay) and the position/orientation of the trailer (e.g., using the method of FIG. 4A) in the same 3D coordinate frame, the controller 301 is able to determine a position/orientation of the trailer relative to the docking bay. In some implementations, by using this self-calibration technique, the controller 301 is able to determine a position/orientation of the trailer relative to the docking bay even if the docking bay itself is not in the image data captured by the 3D camera.

Accordingly, the examples described herein above provide, among other things, a camera-based system and methods for determining an alignment of a vehicle and/or trailer relative to a door or docking bay based on image data captured by a 3D camera. Other features and advantages are set forth in the following claims.

What is claimed is:

1. A method of determining an alignment of a trailer, the method comprising:
   capturing, by a 3D camera system, image data and position data of a field of view, wherein the image data includes a top surface of the trailer at a loading bay;
   determining an estimated height of the top surface of the trailer;
   determining a dynamic height range based on the estimated height of the top surface of the trailer, wherein the dynamic height range includes a range of vertical positions including the estimated height of the top surface of the trailer;
   applying a dynamic depth filter to filter image data corresponding to heights outside of the dynamic height range from the image data captured by the 3D camera system; and
   determining, based on the depth-filtered image data, at least one selected from a group consisting of an angular position of the trailer and a lateral offset of the trailer.

2. The method of claim 1, wherein applying the dynamic depth filter includes
   setting a first plurality of pixels to a first color value, wherein the first plurality of pixels includes all pixels in the captured image data corresponding to positions within the defined dynamic height range; and
   setting a second plurality of pixels to a second color value, wherein the second plurality of pixels includes all pixels in the captured image data corresponding to positions outside of the defined dynamic height range.

3. The method of claim 2, further comprising generating a two dimensional binary image, wherein the two-dimensional binary image includes a downward perspective view of the image data captured by the 3D camera with all pixels including either the first color value or the second color value, and wherein all pixels within the two-dimensional binary image set to the first color value represent objects within the dynamic height range and all pixels set to the second color value represent objects outside of the dynamic height range.

4. The method of claim 1, further comprising estimating a position of an outline of the top surface of the trailer by applying a rectangular approximation to the depth-filtered image data to identify image data corresponding to a rectangular shape of the top surface of the trailer.

5. The method of claim 1, further comprising estimating a position of an outline of the top surface of the trailer by applying an edge-finding processing to the depth-filtered image data to locate edges corresponding to the outline of the top surface of the trailer.

6. The method of claim 5, wherein estimating the position of the outline of the top of the trailer further includes determining a location of at least one corner of the top surface of the trailer based on an intersection of two edges detected by the edge-finding processing.

7. The method of claim 1, further comprising:
estimating a position of an outline of the top surface of the trailer,
wherein the 3D camera system is mounted at a location relative to a docking bay, wherein the top surface of the trailer in the field of view of the 3D camera system includes the top surface of the trailer approaching the docking bay in reverse,
wherein determining the at least one selected from the group consisting of the angular position of the trailer and the lateral offset of the trailer includes
determining, based on the estimated position of the outline of the top surface of the trailer, a centerline of the trailer, and
calculating the angular position of the trailer as an angle of the centerline of the trailer relative to a front edge of the docking bay,
the method further comprising comparing the angular position of the trailer to an angle tolerance threshold, wherein the angle tolerance threshold defines a maximum allowable magnitude of difference between the angular position of the trailer and an angle perpendicular to the front edge of the docking bay.

8. The method of claim 1, further comprising:
estimating a position of an outline of the top surface of the trailer,
wherein the 3D camera system is mounted at a location relative to a docking bay, wherein the top surface of the trailer in the field of view of the 3D camera system includes the top surface of the trailer approaching the docking bay in reverse,
wherein determining the at least one selected from the group consisting of the angular position of the trailer and the lateral offset of the trailer includes
determining, based on the estimated position of the outline of the top surface of the trailer, a centerline of the trailer, and
calculating the lateral offset as a difference between a center point of a line corresponding to the docking bay and a point at which the centerline of the trailer intersects the line corresponding to the docking bay,
the method further comprising comparing the lateral offset of the trailer to an offset tolerance threshold, wherein the offset tolerance threshold defines a maximum allowable magnitude of the lateral offset.

9. The method of claim 1, further comprising generating an alarm signal in response to determining that the at least one selected from the group consisting of the angular position of the trailer and the lateral offset of the trailer exceeds a tolerance threshold.

10. The method of claim 1, further comprising:
generating instructions for adjusting the alignment of the trailer based on the at least one selected from the group consisting of the angular position of the trailer and the lateral offset of the trailer; and
transmitting the instructions to at least one selected from a group consisting of a driver of a vehicle coupled to the trailer and an autonomous driving system of the vehicle coupled to the trailer.

11. The method of claim 1, further comprising:
detecting a calibration target in the image data captured by the 3D camera system;
determining a position of the calibration target in a 3D coordinate frame of the 3D camera system based on the captured image data and the captured position data; and
determining a location and an orientation of a docking bay in the 3D coordinate frame of the 3D camera system based on the determined position of the calibration target in the 3D coordinate frame of the 3D camera system, wherein the location and the orientation of the docking bay relative to the calibration target is known,
wherein determining the at least one selected from the group consisting of the angular position of the trailer and the lateral offset of the trailer includes
determining the angular position of the trailer relative to the docking bay in the 3D coordinate frame of the 3D camera system, and
determining the lateral offset of the trailer relative to the docking bay in the 3D coordinate frame of the 3D camera system.

12. The method of claim 1, wherein determining the estimated height of the top surface of the trailer includes calculating an average height of a plurality of image pixels corresponding to the top surface of the trailer.

13. A trailer alignment determination system, the system comprising:
a controller including an electronic processor and a memory, the controller configured to
receive image data and position data captured by a 3D camera system, the position data indicating positions in 3D space of pixels in the image data, wherein the image data includes a top surface of a trailer at a loading bay,
determine an estimated height of the top surface of the trailer,
determine a dynamic height range based on the estimated height of the top surface of the trailer, wherein the dynamic height range includes a range of vertical positions including the estimated height of the top surface of the trailer,
apply a dynamic depth filter to filter image data corresponding to heights outside of the dynamic height range from the image data captured by the 3D camera system, and
determine, based on the depth-filtered image data, at least one selected from a group consisting of an angular position of the trailer and a lateral offset of the trailer.

14. The system of claim 13, wherein the controller is configured to generate a binary image based on the application of the dynamic depth filter, wherein all image data pixels in the binary image corresponding to positions within the dynamic height range are set to a first color value, and wherein all image data pixels in the binary image corresponding to positions outside of the dynamic height range are set to a second color value.

15. The system of claim 14, wherein the controller is further configured to estimate a position of an outline of the top surface of the trailer in the captured image data by applying an edge-finding processing to the generated binary image and locating a position of at least one corner of the top surface of the trailer based on an intersection between to edges detected by the edge-finding processing.

16. The system of claim 14, wherein the controller is further configured to estimate a position of an outline of the top surface of the trailer in the captured image data by applying a rectangular approximation to the generated binary image to identify image data corresponding to a rectangular shape of the top surface of the trailer.

17. The system of claim 13, further comprising:
a support arm mounted at a location relative to at least one selected from a group consisting of a docking bay and a door; and
a 3D camera system coupled to a distal end of the support arm and positioned with an at least partially downward-facing field of view,
wherein the 3D camera system is coupled to the distal end of the support arm at an angle relative to vertically downward such that a center axis of the field of view of the 3D camera system extends partially downward and partially forward.

18. The system of claim 17, further comprising an adjustable height mounting bracket, wherein a proximal end of the support arm is adjustably coupled to the adjustable height mounting bracket, and wherein a height of the support arm relative to the adjustable height mounting bracket is selectively adjustable.

19. The system of claim 17, further comprising a calibration target positioned at a known location and a known orientation relative to the docking bay, wherein the controller is further configured to
detect the calibration target in the image data captured by the 3D camera system;
determine a position of the calibration target in a 3D coordinate frame of the 3D camera system based on the captured image data and the captured position data; and
determine, based on the determined position of the calibration target in the 3D coordinate frame of the 3D camera system, a location and an orientation in the 3D coordinate frame of the at least one selected from the group consisting of the docking bay and the door, and
wherein the controller is configured to determine the at least one selected from the group consisting of the angular position of the trailer and the lateral offset of the trailer by
determining the angular position of the trailer relative to the docking bay in the 3D coordinate frame of the 3D camera system, and
determining the lateral offset of the trailer relative to the docking bay in the 3D coordinate frame of the 3D camera system.

20. A method of determining an alignment of a trailer, the method comprising:
capturing, by a 3D camera system, image data and position data of a field of view, wherein the image data includes a top surface of the trailer;
determining an estimated height of the top surface of the trailer;
determining a dynamic height range based on the estimated height of the top surface of the trailer, wherein the dynamic height range includes a range of vertical positions including the estimated height of the top surface of the trailer;
applying a dynamic depth filter to filter image data corresponding to heights outside of the dynamic height range from the image data captured by the 3D camera system; and
determining, based on the depth-filtered image data, at least one selected from a group consisting of an angular position of the trailer and a lateral offset of the trailer, wherein applying the dynamic depth filter includes
setting a first plurality of pixels to a first color value, wherein the first plurality of pixels includes all pixels in the captured image data corresponding to positions within the defined dynamic height range; and
setting a second plurality of pixels to a second color value, wherein the second plurality of pixels includes all pixels in the captured image data corresponding to positions outside of the defined dynamic height range.

* * * * *